United States Patent [19]

Oba et al.

[11] Patent Number: 4,769,204

[45] Date of Patent: Sep. 6, 1988

[54] METHOD OF REACTIVE INJECTION MOLDING OF A URETHANE-BASED RESIN COMPOSITION WITH GOOD MOLD RELEASABILITY AND A POLYOL THEREFOR

[75] Inventors: Toshio Oba; Kenichi Isobe, both of Annaka; Shintaro Tachibana, Yokohama; Kazuo Shoji, Fuchu, all of Japan

[73] Assignees: Shin-Etsu Chemical Co., Ltd.; MD Kasei Limited, both of Tokyo, Japan

[21] Appl. No.: 937,031

[22] Filed: Dec. 2, 1986

[30] Foreign Application Priority Data

Dec. 3, 1985 [JP] Japan ................. 60-272124

[51] Int. Cl.$^4$ ............... C08G 18/14; B29C 39/36; C08J 9/14
[52] U.S. Cl. ................. 264/300; 264/45.3; 264/53; 264/328.6; 264/DIG. 83
[58] Field of Search ............ 264/300, 328.6, DIG. 83, 264/53, 45.3

[56] References Cited

U.S. PATENT DOCUMENTS

4,457,887 7/1984 Porsche ...................... 264/300
4,517,150 5/1985 Harashima et al. ........... 264/300

FOREIGN PATENT DOCUMENTS

55-1176 1/1980 Japan .
59-56420 3/1984 Japan .

*Primary Examiner*—Philip Anderson
*Attorney, Agent, or Firm*—Hopgood, Calimafde, Kalil, Blaustein & Judlowe

[57] ABSTRACT

The reactive injection molding of a urethane-based resin composition according to the invention is performed by admixing the polyol compound as one of the reactants of the urethane-based resin with a specific organopolysiloxane as an internal mold release agent so that the molding process can be performed without application of an external mold release agent to the metal mold. The organopolysiloxane is characterized by two types of substituent groups bonded to the silicon atoms, of which the first type is $-C_xH_{2x}OR'$, $R'$ being a monovalent hydrocarbon group of 8 to 30 carbon atoms free from chain end unsaturation and x being 0–4, and the second type is $-C_yH_{2y}(OC_nH_{2n})_mOH$, y being 1–4, n being 2–4 and m being 0–45.

5 Claims, No Drawings

METHOD OF REACTIVE INJECTION MOLDING OF A URETHANE-BASED RESIN COMPOSITION WITH GOOD MOLD RELEASABILITY AND A POLYOL THEREFOR

BACKGROUND OF THE INVENTION

The present invention relates to a method for the so-called reactive injection molding of a urethane-based resin composition and a polyol compound used therefor or, more particularly, to a method for the reactive injection molding of a urethane-based resin composition in which the shaped and cured article of the urethane-based resin composition can readily be released from the metal mold and a polyol compound used therefor with admixture of a specific silicone-based mold release agent to impart the cured urethane-based resin composition with good mold releasability.

It is a trend in recent years that the method of so-called reactive injection molding is applied to the molding of a urethane-based resin composition including polyurethane resins, polyurea resins, polyurethanepolyurea resins and the like. The reactive injection molding is a method in which at least two liquid components or slurry-like components with optional admixture of a filler having reactivity with each other to cause a curing reaction are separately ejected and brought into impingement so as to be rapidly and uniformly mixed together and the mixture is immediately injected into a metal mold where a shaped article is formed by the curing reaction taking place in the mixture. The metal mold is conventionally coated beforehand with a mold release agent such as waxes in order to facilitate releasing the cured and shaped article from the metal mold. This coating work of the metal mold with a mold release agent, however, requires a large amount of labor and a considerable length of working time to greatly decrease the productivity of the molding process. Accordingly, it is very desirable to omit the labor- and time-consuming mold release coating of the metal mold by admixing one or more of the reactive components with a mold release agent in advance or by use of a so-called internal mold release agent. Various internal mold release agents have been proposed for the reactive injection molding of urethane-based resin compositions including carboxyl-containing silicones disclosed in Japanese Patent Publication No. 55-1176 and hydroxy-containing organopolysiloxanes disclosed in Japanese Patent Kokai No. 59-56420.

These conventional internal mold release agents for urethane-based resin compositions are not quite satisfactory or disadvantageous in one or more respects. For example, the carboxyl-containing silicones sometimes deactivate the catalyst indispensable in the formulation of the urethane-based resin compositions so that the polyol component cannot be admixed in advance with the silicone and the molding machine for the reactive injection molding must be adaptable to three components. The hydroxy-containing organopolysiloxanes are usually poorly compatible with the polyol component in the formulation of the urethane-based resin composition so that the polyol component admixed with the organopolysiloxane must be thoroughly agitated directly before use in order to ensure full dispersion of the organopolysiloxane therein.

SUMMARY OF THE INVENTION

The present invention accordingly has an object to provide a novel method for the reactive injection molding of a urethane-based resin composition, in which the cured and shaped article in the metal mold can readily be released from the metal mold by virtue of the use of a specific internal mold release agent free from the above described problems and disadvantages in the conventional internal mold release agents as well as a polyol compound admixed with the internal mold release agent and usable in the reactive injection molding of a urethane-based resin composition.

Thus, the method of the present invention for the reactive injection molding of a urethane-based resin composition comprises admixing the polyol compound brought into reaction with the other reactant with an organopolysiloxane comprising, in a molecule, a first organosiloxane unit of the general formula

$$R_p Si(C_x H_{2x} OR')O_{(3-p)/2}, \qquad (I)$$

and a second organosiloxane unit of the general formula

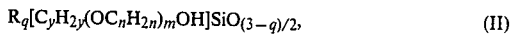

$$R_q[C_y H_{2y}(OC_n H_{2n})_m OH]SiO_{(3-q)/2}, \qquad (II)$$

in which R is a hydrogen atom or a halogen-substituted or unsubstituted monovalent hydrocarbon group selected from the class consisting of alkyl, alkenyl, aryl and cycloalkyl groups, p and q are each zero, 1 or 2, R' is a monovalent hydrocarbon group having 8 to 30 carbon atoms and free from aliphatic unsaturation at the chain-end carbon atom, x is zero or a positive integer not exceeding 4, y is a positive integer not exceeding 4, n is 2, 3 or 4 and m is zero or a positive integer not exceeding 45.

DETAILED DESCRIPTION OF THE PREFERRED EMBODIMENTS

As is understood from the above given summary of the invention, the most characteristic feature of the invention consists in the use of the above defined specific organopolysiloxane as an internal mold release agent which should be mixed together in advance with the polyol compound used in the formulation of the urethane-based resin composition. The organopolysiloxane is highly compatible with the polyol compound so that the mixture of them never causes separation into phases. Furthermore, the organopolysiloxane is quite inert to the catalyst in the formulation of the urethane-based resin composition so that the process of reactive injection molding can be performed without the danger of insufficient curing due to the deactivation of the catalyst by the mold release agent despite the high mold releasability obtained thereby.

The organopolysiloxane used in the inventive method as the internal mold release agent should have, in a molecule, each at least one of the first type of the organosiloxane units of the general formula (I) and at least one of the second type of the organosiloxane units of the general formula (II). In each of the general formulas, R is a hydrogen atom or a monovalent hydrocarbon group selected from the class consisting of alkyl groups, e.g. methyl, ethyl and propyl groups, alkenyl groups, e.g. vinyl and allyl groups, aryl groups, e.g. phenyl and tolyl groups, and cycloalkyl groups, e.g. cyclohexyl group, as well as halogen-substituted monovalent hydrocarbon groups, e.g. chloromethyl and 3,3,3-trifluoropropyl groups. In the general formula (I) representing the first organosiloxane unit, the symbol R' denotes a monovalent hydrocarbon group having from 8 to 30 or, preferably, from 12 to 18 carbon atoms exemplified by saturated aliphatic hydrocarbon groups such as lauryl, myristyl, palmityl and stearyl groups and unsaturated aliphatic hydrocarbon groups of which the carbon atom at the chain end is free from unsaturation such as oleyl and linoleyl groups. The subscript p is zero, 1 or 2 and x is zero or a positive integer not exceeding 4 or, preferably, 3. The second organosiloxane unit has a hydroxy-terminated polyoxyalkylene group and is represented by the general formula (II), in which each of the subscripts q, y, n and m has the definition given above. The organopolysiloxane should have at least each one of these two types of the organosiloxane units in a molecule in combination.

The organopolysiloxane should have a molecular weight in the range from 1000 to 100,000 or, preferably, from 4000 to 40,000. Although the molecular structure of the organopolysiloxane may be linear, branched chain-like or cyclic, the organopolysiloxane should preferably be a diorganopolysiloxane having a linear molecular structure represented by the general formula $R^1{}_3Si-O+SiR_2-O\overline{)_a}(SiRA+O\overline{)_b}(SiRB-O)-$
$\phantom{R^1{}_3Si-O+SiR_2-O\overline{)_a}}\overline{_c}SiR^1{}_3,$ or $R^1{}_2BSi-O+SiR_2-O\overline{)_a}(SiRA+O\overline{)_b}(SiRB-O)-$
$\phantom{R^1{}_2BSi-O+SiR_2-O\overline{)_a}}\overline{_{c-1}}SiR^1{}_2B,$ in which A is the group of the formula $-C_xH_{2x}OR'$ B is the group of the formula $-C_yH_{2y}+O-C_nH_{\overline{2n}})_mOH$, $R^1$ is a monovalent hydrocarbon group such as alkyl groups, e.g. methyl, ethyl and propyl groups, alkenyl groups, e.g. vinyl and allyl groups, aryl groups, e.g. phenyl and tolyl groups and cycloalkyl groups, e.g. cyclohexyl group, as well as a halogen-substituted monovalent hydrocarbon group obtained by the replacement of a part or all of the hydrogen atoms in the above named hydrocarbon groups with halogen atoms such as chloromethyl and 3,3,3-trifluoropropyl groups, R is a hydrogen atom or a substituted or unsubstituted monovalent hydrocarbon group exemplified by the same groups given above as the examples of the group $R^1$ and the subscripts a, b and c are each a positive integer.

Several of the particular examples of the organopolysiloxane include those expressed by the following formulas, in which the symbol Me denotes a methyl group:

Me$_3$Si—O+SiMe$_2$—O$\overline{)_{10}}$+SiMe(C$_3$H$_6$OC$_{18}$H$_{37}$)—O$\overline{)_{13}}$—

+SiMe(C$_3$H$_6$OC$_2$H$_4$OH)—O$\overline{)_{12}}$SiMe$_3$;

Me$_3$Si—O+SiMe$_2$—O$\overline{)_{38}}$+SiMe(C$_3$H$_6$OC$_{12}$H$_{25}$)—O$\overline{)_{15}}$—

+SiMe(C$_3$H$_6$OH)—O$\overline{)_{14}}$—SiMe$_3$;

Me$_3$Si—O+SiMe$_2$—O$\overline{)_{38}}$+SiMe(C$_3$H$_6$OC$_{12}$H$_{25}$)—O$\overline{)_{17}}$—

+SiMe(C$_3$H$_6$OC$_2$H$_4$OH)—O$\overline{)_{12}}$SiMe$_3$;

Me$_3$Si—O+SiMe$_2$—O$\overline{)_{76}}$+SiMe(C$_3$H$_6$OC$_{18}$H$_{37}$)—O$\overline{)_{36}}$—

+SiMe(C$_3$H$_6$OC$_2$H$_4$OH)—O$\overline{)_{12}}$SiMe$_3$;

Me$_3$Si—O+SiMe$_2$—O$\overline{)_{152}}$+SiMe(C$_3$H$_6$OC$_{18}$H$_{37}$)—O$\overline{)_{74}}$—

+SiMe(C$_3$H$_6$OC$_2$H$_4$OH)—O$\overline{)_{12}}$SiMe$_3$;

(HOC$_2$H$_4$OC$_3$H$_6$)Me$_2$Si—O+SiMe$_2$—O$\overline{)_{152}}$+SiMe(C$_3$H$_6$OC$_{18}$H$_{37}$)—

—O$\overline{)_{76}}$—SiMe$_2$(C$_3$H$_6$OC$_2$H$_4$OH);

(H$_{37}$C$_{18}$OC$_3$H$_6$)Me$_2$Si—O+SiMe$_2$—O$\overline{)_{10}}$+SiMe(C$_3$H$_6$OC$_3$H$_6$OH)—

—O$\overline{)_{13}}$—SiMe$_2$(C$_3$H$_6$OC$_{18}$H$_{37}$);

Me$_3$Si—O+SiMe$_2$—O$\overline{)_{40}}$+SiMe(C$_3$H$_6$OC$_{12}$H$_{25}$)—O$\overline{)_{15}}$—

$$+\underset{\underset{C_3H_6O(C_3H_6O)_{18}H}{|}}{SiMe}\phantom{xxxxxx}O\overline{)_{13}}\phantom{xxxx}SiMe_3.$$

These organopolyiloxanes can be prepared by the addition reaction between an organopolysiloxane having hydrogen atoms directly bonded to the silicon atoms and an alkyl allyl ether or an alkyleneglycol monoallyl ether in the presence of a platinum compound as the catalyst by heating the mixture with or without solvents, for example, at 90° C. for 5 hours. It is of course possible that cyclic orgnaosiloxane oligomers having the substituent groups of A and B are synthesized in a similar manner to the above described procedure and then these cyclic organopolysiloxanes oligomers alone or as a mixture with other cyclic organopolysiloxane oligomers are subjected to the ring-opening polymerization in the presence of a terminating organosiloxane compound and an alkaline catalyst according to a known procedure of heating the mixture, for example, at 150° C. for 10 hours. Alternatively, the organopolysiloxane can be prepared by the dehydrochlorination condensation of an organopolysiloxane having $-C_xH_{2x}Cl$ groups bonded to the silicon atoms with an alcohol of the formula R'OH and a Polyoxyalkylene glycol of the formula $H+O-C_nH_{\overline{2n}})_mOH$ successively or simultaneously, for example, in a toluene solution containing an alkali catalyst such as sodium hydroxide under reflux for 5 hours.

Although the organopolysiloxane should have at least each one of the two types A and B of the substituent groups, it is preferable that the organopolysiloxane has the substituent groups A and B each in such an amount that the molar ratio $M_A$ or $M_B$ of the respective groups A or B in % relative to the silicon atoms in a molecule should be in such a range that $M_A$ is in the range from 10 to 100 and $M_B$ is in the range from 0.5 to 50 with the proviso that $M_A + M_B$ is not larger than 100 or, more preferably, $M_A$ is in the range from 25 to 50 and $M_B$ is in the range from 1 to 20 with the proviso that $M_A + M_B$ is not larger than 50. It is also preferable that at least 50 % by moles of the groups denoted by $R^1$ and R in the organopolysiloxane are methyl groups.

When the above described organopolysiloxane is used as an internal mold release agent in the reactive injection molding of a urethane-based resin composition, the high-molecular polyol compound as one of the reactants to form the urethane-based resin should be admixed in advance with the organopolysiloxane together with other ingredients such as chain extender, catalyst, blowing agent, coloring agent and the like. The amount of the organopolysiloxane added to the polyol compound should be in the range from 0.05 to 10% by weight or, preferably, from 0.5 to 5% by weight based on the amount of the urethane-based resin composition after curing by the reactive injection molding. When the amount thereof is too small, no sufficient effect of mold releasing can be obtained as a matter of course while no further improvements can be obtained in the mold releasing effect by the addition of an excessively large amount of the organopolysiloxane rather with some detrimental influence on the properties of the cured and shaped article of the resin composition. It is essential, however, that the optimum amount of the organopolysiloxane should be determined depending on the kind of the particular resin composition.

The organopolysiloxane may be liquid or solid at room temperature. When it is liquid at room temperature, the viscosity thereof should be in the range from 10 to 100,000 centistokes or, preferably, from 100 to 10,000 centistokes at 25° C. When the organopolysiloxane is solid at room temperature, it should be heated and melted prior to blending with the polyol compound. Although the effect of mold releasing can be quite satisfactory in most cases even by use of the organopolysiloxane alone mixed with the polyol compound as such or as melted, it is optional that the organopolysiloxane is used in combination with a conventional mold release agent such as higher fatty acids, e.g. stearic acid, or metal salts thereof, natural and synthetic waxes and the like. It is further optional that the metal mold for the reactive injection molding according to the inventive method is coated with a conventional mold release agent for coating use.

As is described above, the organopolysiloxane as the internal mold release agent used in the inventive method contains the substituent groups A and B bonded to the silicon atoms in the molecule and has good miscibility with the polyol compound as one of the reactants in the formulation of the urethane-based resin composition in the reactive injection molding so that the mixture of the polyol compound and the organopolysiloxane is stable and free from separation into phases to impart the resin composition with excellent mold releasability and the shaped and cured article of the resin composition can readily be released from the metal mold. Furthermore, the organopolysiloxane is inert to the catalyst in the formulation of the urethane-based resin composition so that the shaped and cured article of the resin composition is free from the problem of insufficient curing due to the deactivation of the catalyst by the internal mold release agent.

In the following, examples are given to illustrate the present invention in more detail. In the following examples, the term of "parts" always refers to "parts by weight".

EXAMPLE 1

A polyol mixture was prepared by mixing 85 parts of a polymeric polyol, which was a graft polymer of acrylonitrile on to a polyether triol having an average molecular weight of about 6000, 15 parts of ethylene glycol as a chain extender, 0.04 part of dibutyltin dilaurate and 0.04 part of a tertiary amine as the catalytic ingredients, 4 parts of a blowing agent (Fron R-11E, a product by Asahi Glass Co.) and 3.6 parts of one of the organopolysiloxanes A to E shown below by the formulas as an internal mold release agent.

Organopolysiloxanes

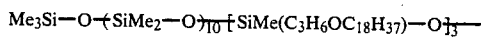
A

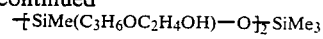
B

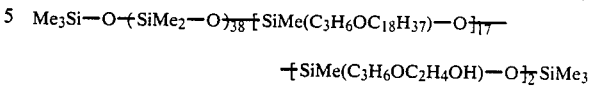
C

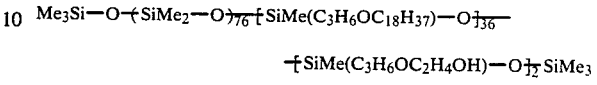
D

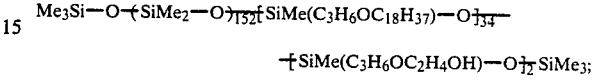
E

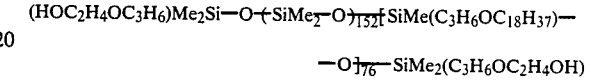

The thus prepared polyol mixture in an amount of 107.68 parts was introduced into a paper cup together with 99.5 parts of an isocyanate component composed of a carbodiimide-modified diphenyl methane diisocyanate and a prepolymer thereof, of which the content of the NCO groups was 23% corresponding to an index of NCO/OH of 104%, and the mixture was agitated for 4 seconds using a hand mixer rotating at 2000 rpm. The mixture was then poured into a metal mold for hand testing coated with a wax as an external mold release agent in advance and cured therein for 3 minutes. The metal mold had a boxlike form of 10 cm by 10 cm wide and 6 cm deep provided with a draft of 100/1000 on each rising surface. The upper half of the metal mold was provided with a rib in such a manner that the shaped body in the metal mold could be carried always by the upper half of the metal mold to be released therefrom when the upper and lower halves of the mold were separated after completion of curing.

After completion of curing of the shaped body in the metal mold, the upper half of the mold was pulled up to release the shaped body from the lower half to determine the force required for pulling up of the upper half of the mold by transformation of the same into a rotating force measurable with a torque meter. The same test of molding and releasing as above was repeated up to 10 times using one and the same metal mold except that the metal mold was not coated with the wax in the second test and later on after the preceding test but kept intact and used as such. Table 1 below summarizes the results of the torque in kgf·m in each of the 1st to 10th tests for the respective organopolysiloxanes. As is clear from the table, excellent mold releasability could be obtained according to the inventive method using the organopolysiloxane as the internal mold release agent in comparison with the comparative test undertaken without using such an internal mold release agent.

TABLE 1

| Organo-Poly-siloxane | Torque for mold releasing, kgf · m | | | | | | | | | |
|---|---|---|---|---|---|---|---|---|---|---|
| | 1st | 2nd | 3rd | 4th | 5th | 6th | 7th | 8th | 9th | 10th |
| None | 23 | 35 | 32 | 52 | * | — | — | — | — | — |
| A | 18 | 20 | 19 | 21 | 22 | 22 | 23 | 25 | 28 | * |
| B | 14 | 20 | 18 | 19 | 18 | 19 | 15 | 18 | 18 | 19 |
| C | 13 | 18 | 20 | 20 | 21 | 20 | 21 | 19 | 21 | 22 |
| D | 13 | 16 | 19 | 18 | 22 | 22 | 22 | 22 | 18 | 22 |

TABLE 1-continued

| Organo-Polysiloxane | Torque for mold releasing, kgf · m | | | | | | | | | |
|---|---|---|---|---|---|---|---|---|---|---|
| | 1st | 2nd | 3rd | 4th | 5th | 6th | 7th | 8th | 9th | 10th |
| E | 18 | 19 | 19 | 19 | 21 | 22 | 21 | 22 | 19 | 21 |

*not measurable due to failure of the rib

EXAMPLE 2

A polyol mixture was prepared by mixing 85 parts of the same polymeric polyol as used in Example 1, 15 parts of ethylene glycol as a chain extender, 0.07 part of dibutyltin dilaurate and 0.10 part of a tertiary amine as the catalytic ingredients, 3.5 parts of a carbon paste, 5.0 parts of the same blowiong agent as used in Example 1 and 4.3 parts of the organopolysiloxane C used in Example 1.

The polyol mixture was introduced into the reservoir of a high-pressure foaming machine, into which 99.5 parts of the same isocyanate component as used in Example 1 were added, and these two components were brought into impingement and mixing together in the mixing head of the machine followed by pouring of the mixture into a metal mold for an automobile bumper in which the mixture was cured into a cured body. The conditions of reactive injection molding included: 150/150 bars of the isocyanate/polyol ejection pressures, 80 kg/minute of the rate of ejection, 35°/35° C. of the isocyanate/polyol liquid temperatures and 70° C. of the temperature of the metal mold.

In the above described molding test, the metal mold was initially cleaned by use of a mold cleaner followed by spraying with an external mold release agent and then thoroughly polished with a clean cloth before it is used in the first run of the test molding. In the second run and later on of the test molding, the metal mold after the preceding run was used as such without further application of the external mold release agent. The test molding was repeated in this manner to give a result that at least 30 automobile bumpers could be molded without problems in the mold releasability.

For comparison, the same test molding as above was undertaken except that the organopolysiloxane C as the internal mold release agent was omitted in the formulation of the polyol mixture. The result in this comparative test molding was that 11 automobile bumpers could be molded without problems in the mold releasability while the molded body in the 12th run could be released from the metal mold with some difficulty.

What is claimed is:

1. A method for the reactive injection molding of a urethane-based resin composition which comprises admixing the polyol compound in the formulation of the urethane-based resin composition with an organopolysiloxane comprising, in a molecule, a first organosiloxane unit of the general formula $$R_pSi(C_xH_{2x}OR')O_{(3-p)/2},$$

and a second organosiloxane unit of the general formula $$R_qSi[C_yH_{2y}(OC_nH_{2n})_mOH]O_{(3-q)/2},$$

in which R is a hydrogen atom or a halogen-substituted or unsubstituted monovalent hydrocarbon group, p and q are each zero, 1 or 2, R' is a monovalent hydrocarbon group having 8 to 30 carbon atoms and free from aliphatic unsaturation at the chain-end carbon atom, x is zero or a positive integer not exceeding 4, y is a positive integer not exceeding 4, n is 2, 3 or 4 and m is zero or a positive integer not exceeding 45.

2. The method for the reactive injection molding of a urethane-based resin composition as claimed in claim 1 wherein the group of the formula $-C_xH_{2x}OR'$ in the first organosiloxane unit is selected from the class consisting of $-C_3H_6OC_{18}H_{37}$ and $-C_3H_6OC_{12}H_{25}$.

3. The method for the reactive injection molding of a urethane-based resin composition as claimed in claim 1 wherein the group of the formula $-C_yH_{2y}(-O-C_nH_{2n})_mOH$ in the second organosiloxane unit is selected from the class consisting of $-C_3H_6OC_2H_4OH$, $-C_3H_6OH$, $-C_3H_6OC_3H_6OH$ and $-C_3H_6O(C_3H_6O)_{19}H$.

4. The method for the reactive injection molding of a urethane-based resin composition as claimed in claim 1 wherein the organopolysiloxane has the substituent groups of the first type of the formula $-C_xH_{2x}OR'$ and the second type of the formula $-C_yH_{2y}(-OC_nH_{2n})_mOH$ in such amounts that the molar ratio $M_A$ in % of the first type substituent groups to the silicon atoms in the organopolysiloxane and the molar ratio $M_B$ in % of the second type substituent groups to the silicon atoms in the organopolysiloxane have values that $M_A$ is in the range from 10 to 100 and $M_B$ is in the range from 0.5 to 50 with the proviso that $M_A + M_B$ is not larger than 100.

5. The method for the reactive injection molding of a urethane-based resin composition as claimed in claim 1 wherein the amount of the organopolysiloxane admixed with the polyol compound is in the range from 0.05 to 10 % by weight based on the amount of the urethane-based resin composition.

* * * * *

UNITED STATES PATENT AND TRADEMARK OFFICE
CERTIFICATE OF CORRECTION

PATENT NO. : 4,769,204
DATED : September 6, 1988
INVENTOR(S) : Toshio Oba et al.

It is certified that error appears in the above-identified patent and that said Letters Patent is hereby corrected as shown below:

In claim 3, column 8, line 30 the formula reading:

$H_{an}\!\!\!\!-\!\!\!\!_{m}OH$ should read: $H_{2n}\!\!\!\!-\!\!\!\!_{m}OH$.

Signed and Sealed this

Twenty-eighth Day of February, 1989

Attest:

DONALD J. QUIGG

Attesting Officer

Commissioner of Patents and Trademarks